United States Patent
Kimura et al.

(10) Patent No.: US 8,802,169 B2
(45) Date of Patent: Aug. 12, 2014

(54) PROCESS FOR PRODUCING SPARKLING ALCOHOLIC DRINK AND SPARKLING ALCOHOLIC DRINK PRODUCED BY USING THE PROCESS

(75) Inventors: Tatsuji Kimura, Yaizu (JP); Naoyuki Kobayashi, Yaizu (JP); Syunsuke Fukuhara, Yaizu (JP); Shigehisa Yokoi, Funabashi (JP)

(73) Assignee: Sapporo Breweries Limited, Tokyo (JP)

( * ) Notice: Subject to any disclaimer, the term of this patent is extended or adjusted under 35 U.S.C. 154(b) by 843 days.

(21) Appl. No.: 11/912,229

(22) PCT Filed: Apr. 21, 2006

(86) PCT No.: PCT/JP2006/308469
§ 371 (c)(1),
(2), (4) Date: Mar. 4, 2008

(87) PCT Pub. No.: WO2006/115224
PCT Pub. Date: Nov. 2, 2006

(65) Prior Publication Data
US 2009/0022847 A1    Jan. 22, 2009

(30) Foreign Application Priority Data

Apr. 22, 2005    (JP) ................. 2005-125325

(51) Int. Cl.
*C12C 11/00*    (2006.01)
(52) U.S. Cl.
USPC .............. 426/16; 426/11; 426/29; 426/330.4; 426/592
(58) Field of Classification Search
USPC ....................... 426/11, 16, 29, 592
See application file for complete search history.

(56) References Cited

FOREIGN PATENT DOCUMENTS

| CN | 1054097 A | | 8/1991 |
|---|---|---|---|
| CN | 1114682 A | | 1/1996 |
| CN | 1196385 | * | 10/1998 |
| CN | 1196385 A | | 10/1998 |

(Continued)

OTHER PUBLICATIONS http://www.nottinghambrewery.com/Mushy.html accessed Jul. 17, 2011 (reference date Oct. 2001) Mushy Pea Beers.*

(Continued)

*Primary Examiner* — Vera Stulii
(74) *Attorney, Agent, or Firm* — Oblon, Spivak, McClelland, Maier & Neustadt, L.L.P.

(57) ABSTRACT

It is an object of the present invention to provide a method of producing a foaming alcoholic beverage such as beer, low-malt beer, and a beer-flavored foaming alcoholic beverage obtained by producing, without using any kind of barley (e.g., barley, wheat, malt), a pre-fermentation liquid using at least a syrup containing sources of carbon, sources of nitrogen, hops and water as raw materials and fermenting the pre-fermentation liquid with use of brewers' yeasts, wherein germinated grains are used; to thereby increase fermentability and attain superior flavor and improved foam quality. It is also an object of the present invention to provide an alcoholic beverage manufactured by the aforementioned method.
Especially, a germinated material, which is obtained by selecting at least one material from a group consisting of corns, potatoes, peas, soy beans, black soy beans, adzuki beans, Taisho Kintoki beans and unpolished rice and germinating the selected material, is used as a part of a raw material of the aforementioned foaming alcoholic beverage. Thereby, a foaming alcoholic beverage can be provided with improved foam quality, flavor quality and fermentability unique to the foaming alcoholic beverage.

11 Claims, 8 Drawing Sheets

(56) References Cited

FOREIGN PATENT DOCUMENTS

| | | | |
|---|---|---|---|
| CN | 1363652 A | | 8/2002 |
| CN | 1375548 A | | 10/2002 |
| CN | 1489934 A | * | 4/2004 |
| DE | 30 28 360 A1 | | 3/1982 |
| DE | 3028360 | | 3/1982 |
| DE | 33 44 843 A1 | | 6/1985 |
| EP | 0 949 328 A1 | | 10/1999 |
| JP | 61 88869 | | 5/1986 |
| JP | 3-139272 | | 6/1991 |
| JP | 10 191954 | | 7/1998 |
| JP | 10 229868 | | 9/1998 |
| JP | 10-229868 | * | 9/1998 |
| JP | 2001 37462 | | 2/2001 |
| JP | 2004 81171 | | 3/2004 |
| JP | 2006-288379 | | 10/2006 |
| JP | 2006-296407 | | 11/2006 |
| JP | 2006-304764 | | 11/2006 |
| WO | 04 000990 | | 12/2003 |
| WO | WO 2005/005593 A1 | | 1/2005 |

OTHER PUBLICATIONS

U.S. Appl. No. 12/666,674, filed Dec. 24, 2009, Kimura, et al.
U.S. Appl. No. 12/666,706, filed Dec. 24, 2009, Kimura, et al.
Miyachi, Hideo, "Beer Jozo Gijutsu", Kabushiki Kaisha Shokuhin Sangyo Shinbunsha, pp. 120, 135 to 136, 216 to 217, 1999.
Brauer J., et al., "Of Pseudocereals and Roasted Rice", The Brewer & Distiller, vol. 1, Issue 4, pp. 24 to 26, 2005.
Office Action Issued Mar. 22, 2011, in Chinese Patent Application No. 200680016735.7 (with English language translation).
Office Action issued Jul. 5, 2011 in Japanese Patent Application No. 2007-514693 (with English translation).
Office Action issued Feb. 7, 2012, in Japanese Patent Application No. 2007-514693 (with partial English-language translation).
Chinese Office Action issued Nov. 18, 2011, in Patent Application No. 200680016735.7 (with English-language translation).
Dennis Edward Briggs, "Malts and Malting", Blackie Academic & Professional, 1998, p. 35.
Dennis Edward Briggs, "Malts and Malting", Blackie Academic & Professional, 1998, p. 35 (previously filed on Jan. 12, 2012; Submitting Statement of Relevancy only).
Extended European Search Report issued Jan. 13, 2012, in Patent Application No. 06732227.1.
Nduka Okafor, et al, "Malting and brewing qualities of some Nigerian rice ( *Oryza sativa* L.) varieties and some thoughts on the assessment of malts from tropical cereals", World Journal of Microbiology and Biotechnology, Kluwer Academic Publishers, DO, vol. 6, No. 2, XP-002603428, Dec. 31, 1990, pp. 187-194.
Office Action issued in Canadian Patent Application No. 2,605,368 issued May 17, 2013.

* cited by examiner

PROCESS FOR PRODUCING SPARKLING ALCOHOLIC DRINK AND SPARKLING ALCOHOLIC DRINK PRODUCED BY USING THE PROCESS

TECHNICAL FIELD

This invention generally relates to a method of producing a foaming alcoholic beverage and an alcoholic beverage produced by said method.

More specifically, this invention relates to a method of producing a foaming alcoholic beverage including a malt alcoholic beverage such as beer and low-malt beer, or a beer-flavored alcoholic beverage which is obtained by producing a pre-fermentation liquid using at least a syrup containing sources of carbon, sources of nitrogen, hops and water as raw materials and using no type of barley (e.g., malt) and fermenting the pre-fermentation liquid using brewers' yeasts, in which germinated grains are used as a raw material for improving foam formability/foam quality (foam stability, foam generating property), flavor and fermentability; and to a foaming alcoholic beverage produced by said method.

BACKGROUND ART

Conventionally, there are foaming alcoholic beverages such as beer and low-malt beer which use malt as a main material. The malt used as a main material significantly contributes to, for example, the flavor, the foam quality (foam stability, foam generating property), and the fermentability of beer and low-malt beer.

On the other hand, beer-flavored foaming alcoholic beverages without using barley, wheat and malt have been developed and are sold in the marketplace. Such beer-flavored foaming alcoholic beverages have a flavor, a foam stability and a foam generating property that are similar to those of beer or low-malt beer.

More specifically, they have a characteristic refreshing flavor which is obtained by producing a pre-fermentation liquid by using a syrup containing sources of carbon, sources of nitrogen such as an amino acid containing substance, water, and hops along with adding a raw material for improving foam quality or a flavoring agent if necessary, and performing alcohol fermentation on the pre-fermentation liquid by adding brewers' yeasts in a same manner performed in a typical process for producing beer.

These foaming alcoholic beverages commonly have characteristics such as foam quality (e.g., foam generating property, foam stability) and a unique flavor as represented by beer. One important factor related to the improvement of the unique flavor (resembling beer or low-malt beer while having a refreshing flavor) and the foam qualities is protein. In beer, for example, proteins included in malt and sub-materials are digested by enzymes which decompose the protein (e.g., protease) included in malt during a malting and mashing process, and become water-soluble protein and amino acids; they, basically, become sources of nitrogen for serving as nutrition sources of brewers' yeasts, and at the same time, contribute to improvement of foam quality and flavor quality. Also, sources of nitrogen are used as materials for use in the above beer-flavored foaming alcoholic beverages. The suitable sources of nitrogen are materials including amino acid. For example, after extracting a starch ingredient from corns, potatoes, peas, soy beans, rice and so on, then passing the starch ingredient through a decomposition process, a part of nitrogen ingredients is decomposed into amino acid.

Also, proteins which are extracted from peas and soy beans, soy bean saponin, a yucca saponin, a guillai saponin, a tea saponin, plant extraction saponin system materials such as Koma carrot saponins, egg white peptide, protein system materials such as cow serum albumin, xanthan gum, carrageenan, pectin, Arabia gum, agar, thickeners such as gellan gum and alginic acid ester are used, according to necessity, as a substance for improving foam quality.

However, the above sources of nitrogen can be used not only for beer-flavored foaming alcoholic beverages but also for low-malt beer. Thereby, they can contribute to improving flavor and foam quality.

Patent Document 1: Japanese Laid-Open Patent Application No. 2001-37462
Patent Document 2: Japanese Laid-Open Patent Application No. 2004-81171

Problem to be Solved by the Invention

As a result of researching and developing a material for improving, for example, foam quality, flavor quality and fermentability for a foaming malt alcoholic beverage (e.g., beer, low-malt beer) and a beer-flavor foaming alcoholic beverage, the present inventor found that germinated grains are effective as a new material, especially corns, potatoes, peas, soy beans, black soy beans, adzuki beans, Taisho Kintoki beans and unpolished rice.

Therefore, in view of the above, it is an object of the present invention to provide a method of producing a foaming alcoholic beverage that has superior flavor along with improved foam quality, flavor, and fermentability by using at least one of germinated corns, potatoes, peas, soy beans, black soy beans, adzuki beans, Taisho Kintoki beans and unpolished rice in a method of producing a foaming alcoholic beverage such as beer, low-malt beer and a beer-flavor foaming alcoholic beverages obtained by producing a pre-fermentation liquid by using at least a syrup containing sources of carbon, sources of nitrogen, hops and water as raw materials without using barley, wheat and malt, and fermenting the pre-fermentation liquid with use of brewers' yeasts.

In other words, the above-mentioned object can be achieved by providing a method of producing a foaming alcoholic beverage, characterized by: using, as part of a raw material, a germinated material obtained by selecting at least one material from a group consisting of corns, potatoes, peas, soy beans, black soy beans, adzuki beans, Taisho Kintoki beans and unpolished rice, and germinating the selected material, as taught in claim 1.

According to the invention taught in claim 1, a germinated material, which is obtained by selecting at least one material from a group consisting of corns, potatoes, peas, soy beans, black soy beans, adzuki beans, Taisho Kintoki beans and unpolished rice and germinating the selected material, is used as a part of a raw material. Thereby, it can be used as a source of nitrogen or a raw material for improving foam quality. Thus, a method of producing a foaming alcoholic beverage can be provided with an improved flavor, a satisfactory foam quality, and a superior fermentability.

The invention claimed in claim 2, based on the invention taught in claim 1, is characterized in that a pre-fermentation liquid is produced by performing mashing with use of a milled germinated material or the germinated material together with another raw material, wherein alcoholic fermentation is performed by adding brewers' yeasts to the pre-fermentation liquid.

According to the invention taught in claim 2, by performing mashing with use of a milled germinated material or the germinated material together with another raw material and by performing alcoholic fermentation by adding brewers' yeasts to the pre-fermentation liquid, a method of producing a foaming alcoholic beverage can be provided with an improved flavor and a satisfactory foam quality. For example, foam characteristics such as foam generating property and foam stability can be improved along with increasing fermentability and attaining a unique flavor and a refreshing clear drinking aftertaste for a foaming alcoholic beverage which does not use barley, wheat and malt.

The invention claimed in claim 3, based on the invention taught in claim 1 or 2, is characterized in that the milled germinated material or the germinated material is used as a foam quality improving substance.

According to the invention taught in claim 3, by using, as a part of a raw material, the milled germinated material or the germinated material as a foam quality improving substance, a method of producing a foaming alcoholic beverage can be provided with a satisfactory foam quality. For example, foam characteristics such as foam generating property and foam stability can be improved along with attaining a unique flavor and a refreshing clear drinking aftertaste for a foaming alcoholic beverage which does not use barley, wheat and malt.

The invention claimed in claim 4, based on the invention taught in claim 1 or 2, is characterized in that the milled germinated material or the germinated material is used as a flavor improving substance.

According to the invention taught in claim 4, by using, as a part of a raw material, the milled germinated material or the germinated material as a flavor improving substance, a method of producing a foaming alcoholic beverage can be provided with an improved flavor and a satisfactory foam quality by selecting the days for germination. For example, by using a material approximately 3 days from its germination for the purpose of improving foam characteristics such as foam generating property and foam stability and by further adding a material approximately 10 days from its germination for the purpose of improving flavor, a unique flavor and a refreshing clear drinking aftertaste can be attained for a foaming alcoholic beverage which does not use barley, wheat and malt.

The invention claimed in claim 5, based on the invention taught in claim 1 or 2, is characterized in that the milled germinated material or the germinated material is used as a fermentability improving substance.

According to the invention taught in claim 5, by using, as a part of a raw material, the milled germinated material or the germinated material as a fermentability improving substance, a method of producing a foaming alcoholic beverage can be provided with an improved fermentability and a satisfactory foam quality by selecting the days for germination. For example, by using a material approximately 3 days from its germination for the purpose of improving foam characteristics such as foam generating property and foam stability and by further adding a material approximately 10 days from its germination for the purpose of improving fermentability, flavor quality can be improved along with attaining a unique flavor and a refreshing clear drinking aftertaste for a foaming alcoholic beverage which does not use barley, wheat and malt.

The invention claimed in claim 6, based on the invention taught in any one of claims 1 through 5, is characterized in that the milled germinated material or the germinated material, having 0-15 days elapsed from germination, is used.

According to the invention taught in claim 6, by using, as a part of a raw material, the milled germinated material or the germinated material having 0-15 days from germination, a method of producing a foaming alcoholic beverage can be provided with an improved flavor and a satisfactory foam quality. For example, foam characteristics such as foam generating property and foam stability can be improved along with increasing fermentability and attaining a unique flavor and a refreshing clear drinking aftertaste for a foaming alcoholic beverage which does not use barley, wheat and malt.

The invention claimed in claim 7, based on the invention taught in any one of claims 1 through 6, is characterized in that a coloring agent and a flavoring agent are further added during a boiling process.

According to the invention taught in claim 7, by further adding a coloring agent and a flavoring agent during a boiling process, a method of producing a foaming alcoholic beverage can be provided with a favorable appearance, an improved favorable flavor and a satisfactory foam quality. For example, foam characteristics such as foam generating property and foam stability can be improved along with attaining a more beer-like appearance, an enhanced unique flavor, and a refreshing clear drinking aftertaste for a foaming alcoholic beverage which does not use barley, wheat and malt.

The invention claimed in claim 8 can be achieved by a foaming alcoholic beverage obtained by the method of producing a foaming alcoholic beverage as claimed in any one of claims 1 through 7.

According to the invention taught in claim 8, a foaming alcoholic beverage such as a malt alcoholic beverage (e.g., beer, low-malt beer) or a foaming alcoholic beverage which does not use barley, wheat and malt can be provided with an improved flavor, enhanced foam characteristics (e.g., foam generating property and foam stability) and a refreshing clear drinking aftertaste.

Effect of the Invention

According to the present invention, there is provided a method of producing a foaming alcoholic beverage such as beer, low-malt beer, and a beer-flavored foaming alcoholic beverage obtained by producing a pre-fermentation liquid without using barley, wheat and malt but by using at least a syrup containing sources of carbon, sources of nitrogen, hops and water as raw materials and fermenting the pre-fermentation liquid by using brewers' yeasts, wherein a germinated material, which is obtained by selecting at least one material from a group consisting of corns, potatoes, peas, soy beans, black soy beans, adzuki beans, Taisho Kintoki beans and unpolished rice and germinating the selected material, is used. By using the germinated material as a part of the raw materials, a foaming alcoholic beverage can be provided having an improved unique foam quality found in foaming alcoholic beverages and an improved flavor represented by beer.

BEST MODE FOR CARRYING OUT THE INVENTION

Below, with respect to the best mode of the present invention, a method of producing a foaming alcoholic beverage is described in detail by using a case of applying the present invention to a beer-flavored foaming alcoholic beverage. Described below is a method of producing a preferable embodiment of a foaming alcoholic beverage, that is, a beer-flavored foaming alcoholic beverage using no barley, wheat, or malt but using germinated peas as a part of a raw material for serving as the source of nitrogen.

First of all, a typical process of producing a beer-flavored foaming alcoholic beverage is explained below.

First, hot water is added to raw materials including a syrup containing sources of carbon, sources of nitrogen serving as a substance containing amino acid other than wheat or malt, hops, and, if necessary, coloring agents and substances for improving the foam generating property and foam stability, to thereby become a solution including ingredients of abundant sugar and amino acids. Then, after the solution is boiled once, spent hops are removed from the solution and the solution is chilled so that the solution is made to be a pre-fermentation liquid. The pre-fermentation liquid, which is produced as described above, is fermented by using yeasts for fermentation (e.g., brewers' yeasts) in a manner similar to that performed in a typical beer producing process. Then, the fermented liquid is stored. Accordingly, a beer-flavored foaming alcoholic beverage can be obtained without using starch materials such as barley, wheat and malt. It is to be noted that, in general, flavoring agents for providing a beer-like flavor and other additives providing functionality and herbs for providing characteristics to flavor may be added if necessary after the fermentation. The produced beer-flavored foaming alcoholic beverage can attain a flavor similar to beer and a foaming property of carbon dioxide.

In the above-described method of producing a beer-flavored foaming alcoholic beverage according to an embodiment of the present invention, a pre-fermentation liquid is produced by performing mashing germinated peas together with another raw material, and alcoholic fermentation is performed by adding brewers' yeasts to the pre-fermentation liquid. Thereby, flavor, foam quality, and fermentability can be improved.

Although germinated peas are used as a part of the raw materials according to a preferable embodiment of the present invention, the germinated material usable for the present invention may be used by selecting from at least one of a group consisting of corns, potatoes, peas, soy beans, black soy beans, adzuki beans, Taisho Kintoki beans and unpolished rice.

Next, germination conditions are explained.

In this example, among the germinated material selectable from a group consisting of corn, potatoes, peas, soy beans, black soy beans, adzuki beans, Taisho Kintoki beans and unpolished rice, reference will be made to peas.

After soaking peas in 0 to 40° C. water for 1 to 48 hours, the germination was performed at 0 to 40° C. A wet condition was kept during the germination. The germination was performed for a 0 (soaking beans only) to 15 days period.

Next, sintering conditions are explained below.

A sintering process is performed by moving the germinated peas to a stainless steel bath and gradually increasing temperature around 50 to 90° C. After completion of the sintering, roots and husks were removed and bean parts were milled, so as to be used for mashing.

Next, mashing conditions after germination and sintering are explained.

In producing the pre-fermentation liquid, a mashing process was performed by including time for decomposition into low molecules during germination along with protein rest and saccharification which are performed in a mashing process for producing beer. That is, although syrup, caramel and pea protein are typically added around 80° C., milled germinated peas alone or milled germinated peas in a solution of syrup and caramel are added at around 50° C. and kept in such state for 0-120 minutes. During this period, a process of decomposing protein into low molecules is performed by a proteolytic enzyme in the germinated peas. Thereby, sources of nitrogen such as amino acids are obtained. Then, temperature is increased and the reaction is kept around 65° C. for 0-120 minutes again, and during this period, saccharification enzymes in peas promote the process of decomposing carbohydrates into low molecules. After that, temperature is increased, boiling is performed after adding hops, and a cold wort is prepared.

After that, spent hops are removed from the pre-fermentation liquid which has finished boiling in a settling tank and the pre-fermentation liquid is cooled until approximately 10° C. The cooled pre-fermentation liquid is fermented by adding brewers' yeasts. Then, the fermented liquid is stored at −1° C. and brewers' yeasts is removed by filtration and a final beer-flavored foaming alcoholic beverage can be obtained.

Therefore, a foaming alcoholic beverage having a flavor peculiar to beer, a refreshing clearness, and an improved foam quality can be obtained by using the germinated peas. It is to be noted that the germinated peas may be added at around a typical temperature of 80° C. by adjusting the germination period.

Furthermore, in a manner similar to the beer-flavored foaming alcoholic beverage, the above-described germinated peas may also be used for a method of producing beer or low-malt beer.

EXAMPLES

Below, examples that were carried out according to the production method of the present invention are described. However, the present invention is not limited to these examples.

Example 1

In a method of producing a beer-flavored foaming alcoholic beverage according to this example, a brewing examination, which is performed by using germinated peas as a part of the raw materials, is explained. It is to be noted that these examples were experimentally conducted in 3.9 liter-sized brewing facilities. The final alcoholic concentration for all examination products was adjusted to 5.0 volume %.

In order to produce a pre-fermentation liquid in a mashing scale of 3.9 l, 600 g of syrup serving as a source of carbon and 15.6 g of germinated peas produced in the above-described manner were used. The germinated peas, which were milled beforehand, were dissolved in water having a temperature lower than 50° C. (prevents proteolytic enzyme from degrading) and then moved into a boiling container together with the syrup and so on. In this mashing process, protein rest was performed in a state keeping a liquid temperature at 50° C. for 30 minutes, so that produce sources of nitrogen such as amino acids was produced by decomposition of protein. After that, the temperature was increased to 65° C. and kept for 30 minutes, so that carbohydrates in the liquid were decomposed to low molecules by the saccharification enzyme in the germinated peas. Then, degradable glycation materials were produced by brewers' yeasts. In addition, the boiling process was finished after performing further increase of temperature, adding hops, and boiling. It is to be noted that a coloring agent such as caramel or a flavoring agent may be added during this boiling process if necessary.

Then, the pre-fermentation liquid was obtained by removing spent hops, etc., from the liquid by a settling tank (referred to as a whirlpool), adjusting the concentration of the extract to 12.0 weight %, and cooling the extract to 10° C.

The pre-fermentation had brewers' yeasts added thereto and was fermented at 6-15° C. for approximately 5 days. Then, it was stored at −1° C.

The fermented liquid was filtrated with use a kieselguhr for having yeast removed therefrom. Thereby, a final beer-flavored foaming alcoholic beverage was obtained.

In the above-described production procedures, the beer-flavored foaming alcoholic beverages were produced by using germinated peas which have a germination period of 0, 3, 6, 9, 12 and 15 days, respectively. Then, these were set as test samples for measuring foam quality and amount of sources of nitrogen included in the pre-fermentation liquid. The above production method is a method of producing a beer-flavored foaming alcoholic beverage using a proteolytic enzyme. Thus, a relationship between conditions of using the proteolytic enzyme in the producing process of the production method and foam stability was examined.

Figure 1:
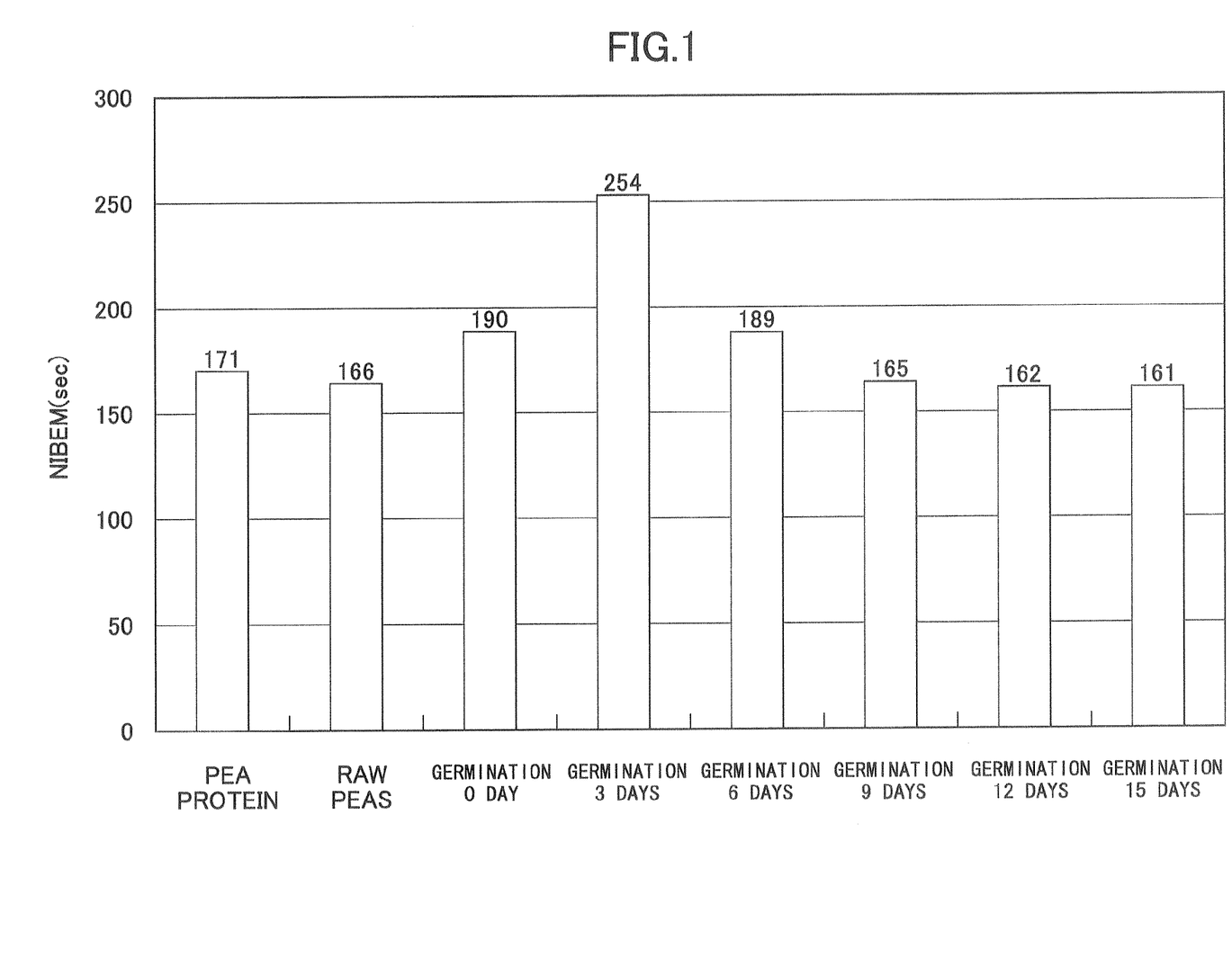
FIG. 1 is a graph showing NIBEM values of the beer-flavored foaming alcoholic beverages which were produced by using peas where the germination days are different as sources of nitrogen.

FIG. 1 shows measurement of foam stability (NIBEM value) for each of the above samples. Among the samples, the sample having a germination period of 3 days exhibits the best foam stability; on the other hand, the NIBEM values decreased for other samples. If the germination period is shorter than 3 days, the NIBEM value decreased. As a comparative value, in a case where protein extracted from peas was used, foam quality numerically improved for germinated peas which were germinated for 0-6 days when comparing the NIBEM value with respect to a case of using raw peas for producing a beer-flavored foaming alcoholic beverage by performing the above-described producing procedures. According to the above-mentioned measurement results, by germinating the peas, soluble protein, which is decomposed into low molecules, increases in proportion to the germination period. Further, proteolytic enzyme also increases as the germination process progresses. By mashing the germinated peas, a part of the soluble protein is decomposed into sources of nitrogen such as amino acids by the proteolytic enzyme. Thereby, it is considered that a pre-fermentation liquid including abundant soluble protein and sources of nitrogen can be obtained.

Figure 2:
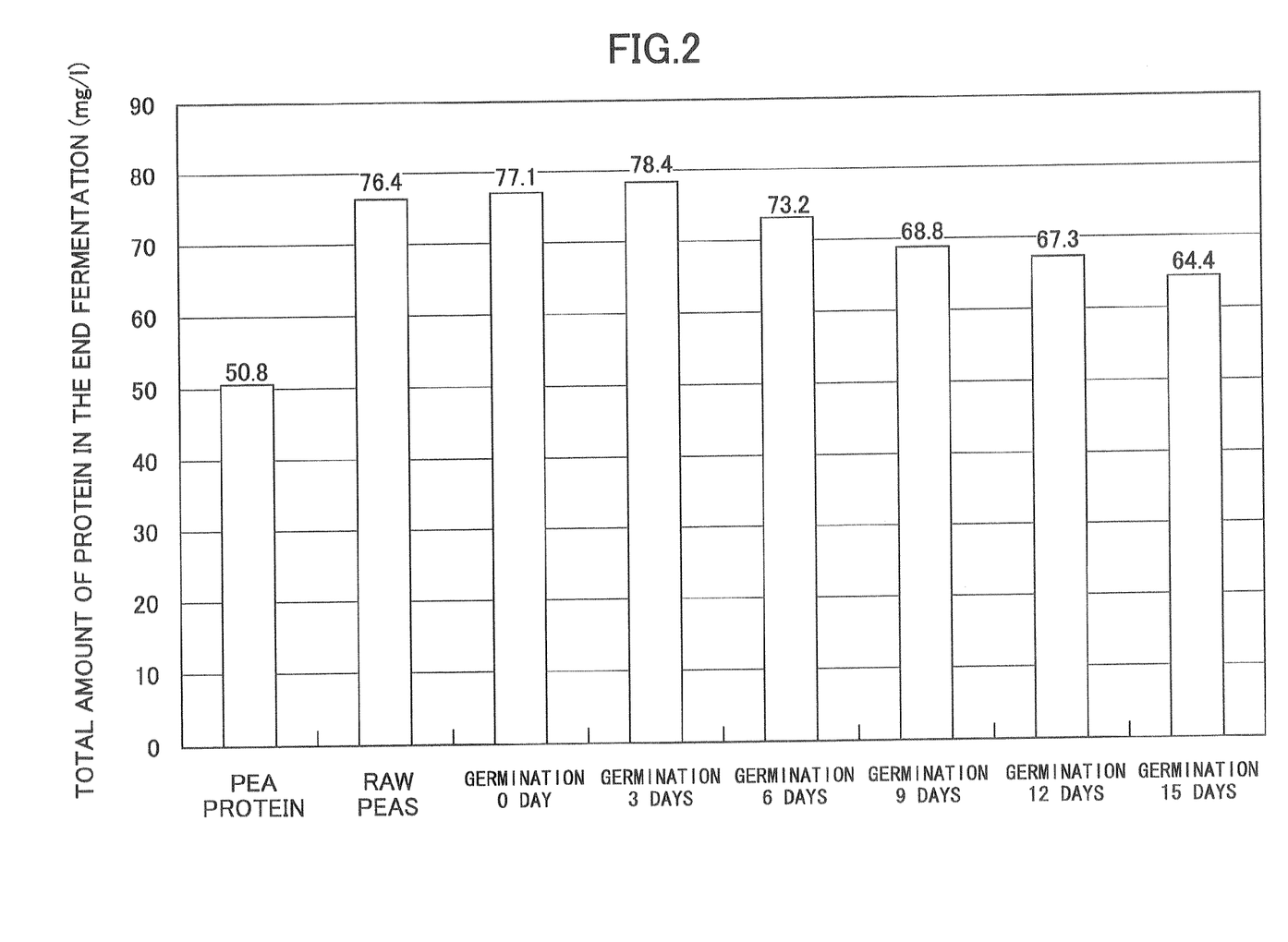
FIG. 2 is a graph showing the total amount of protein in the end fermentation of the beer-flavored foaming alcoholic beverages which were produced by using peas where the germination days are different as sources of nitrogen.
Figure 3:
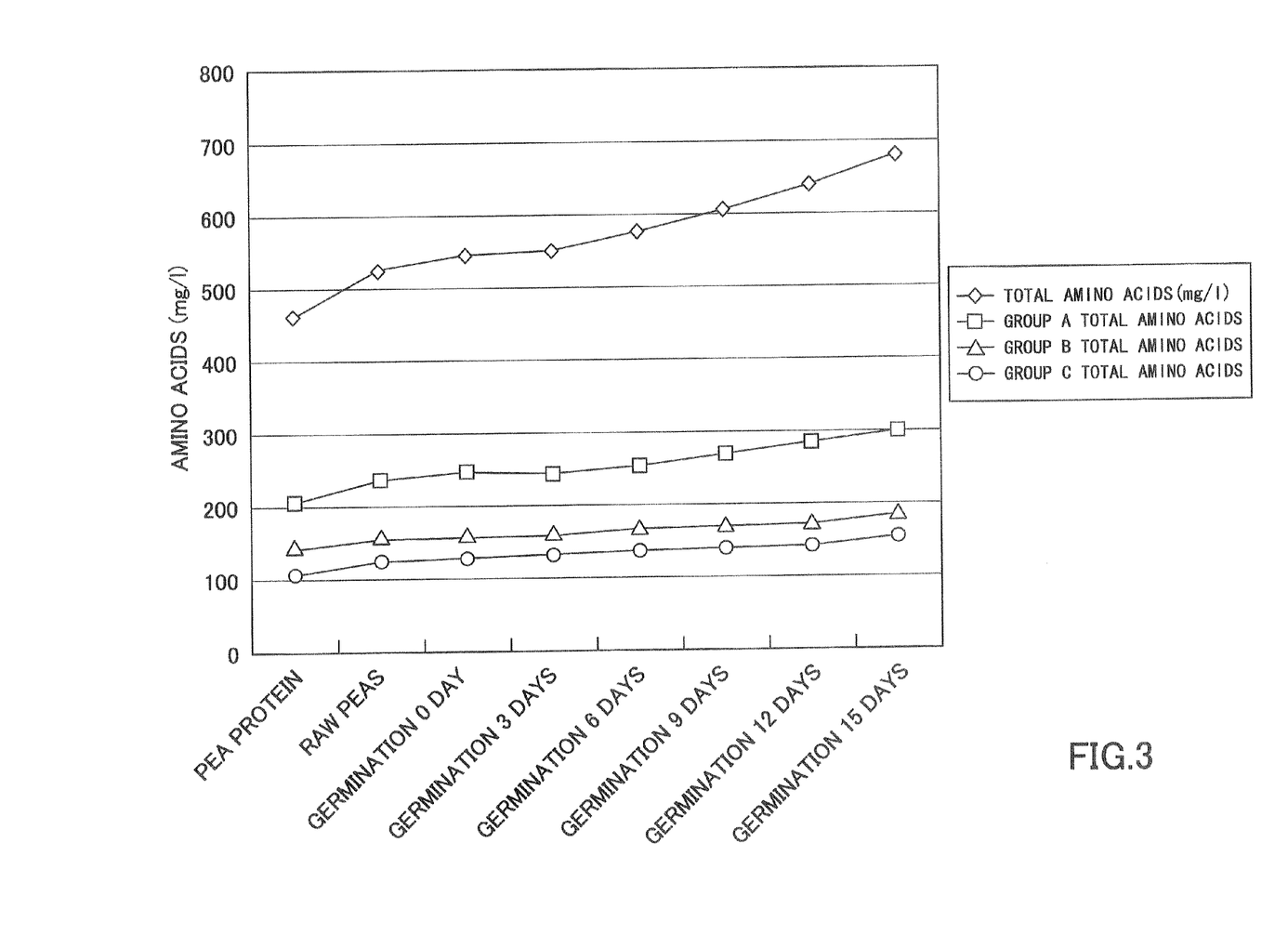
FIG. 3 is a graph showing the total amount of amino acid in the cold wort of the beer-flavored foaming alcoholic beverages which were produced by using peas where the germination days are different as sources of nitrogen.

Next, total amount of protein in the end fermentation and amino acid amount in the pre-fermentation liquid were measured and shown in FIG. 2 and FIG. 3, respectively. The total amount of protein exhibited a high value for the sample of 3 days germination having the best foam quality. On the other hand, since the amount of amino acid increases as the germination days increases, it is recognized that flavor, soluble proteins which affect foam quality and sources of nitrogen are abundant owing to the germinated peas.

Figure 4:
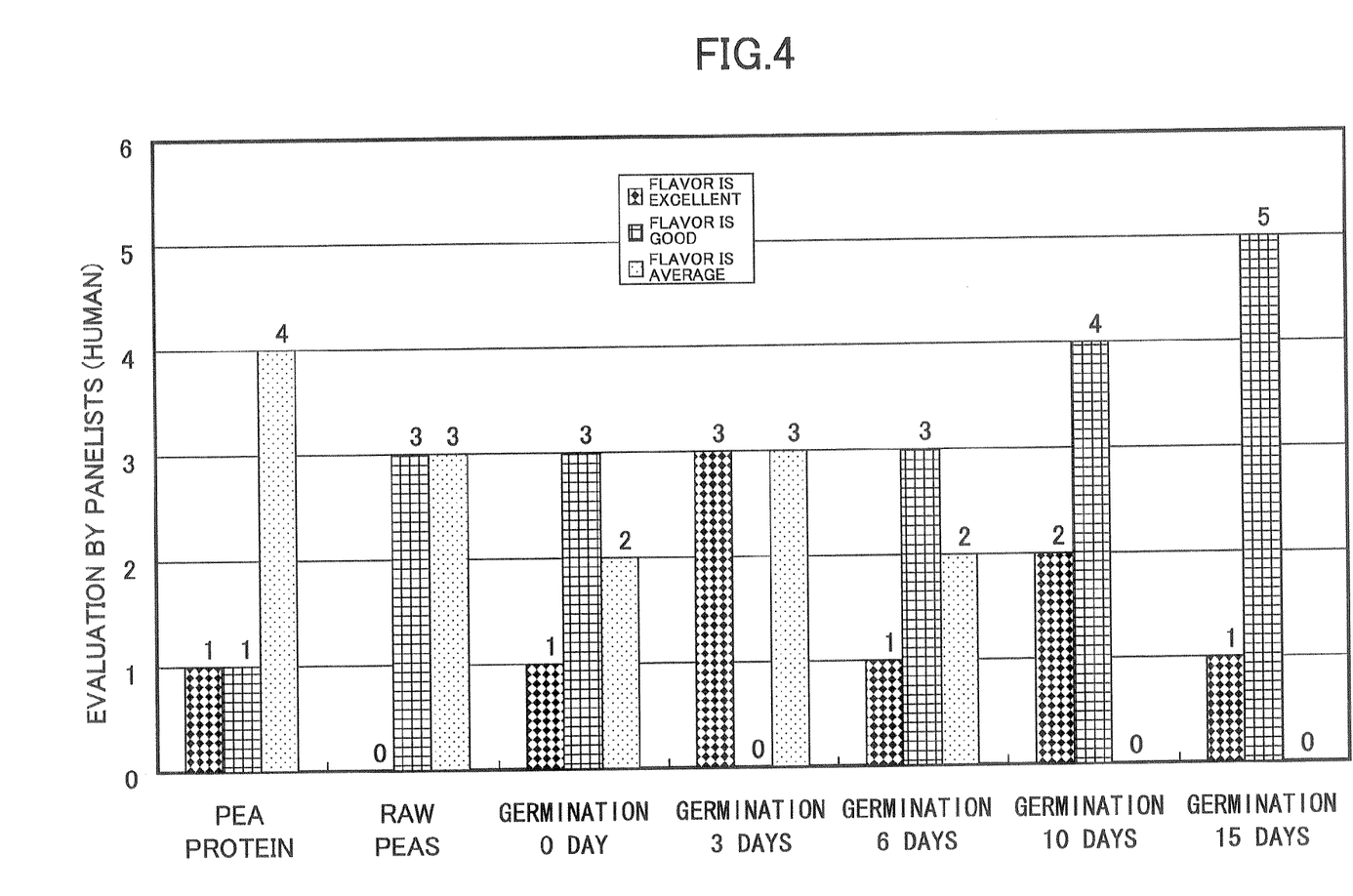
FIG. 4 is a graph showing a result of a sensory evaluation of the beer-flavored foaming alcoholic beverages which were produced by using peas where the germination days are different as sources of nitrogen.
Figure 5:
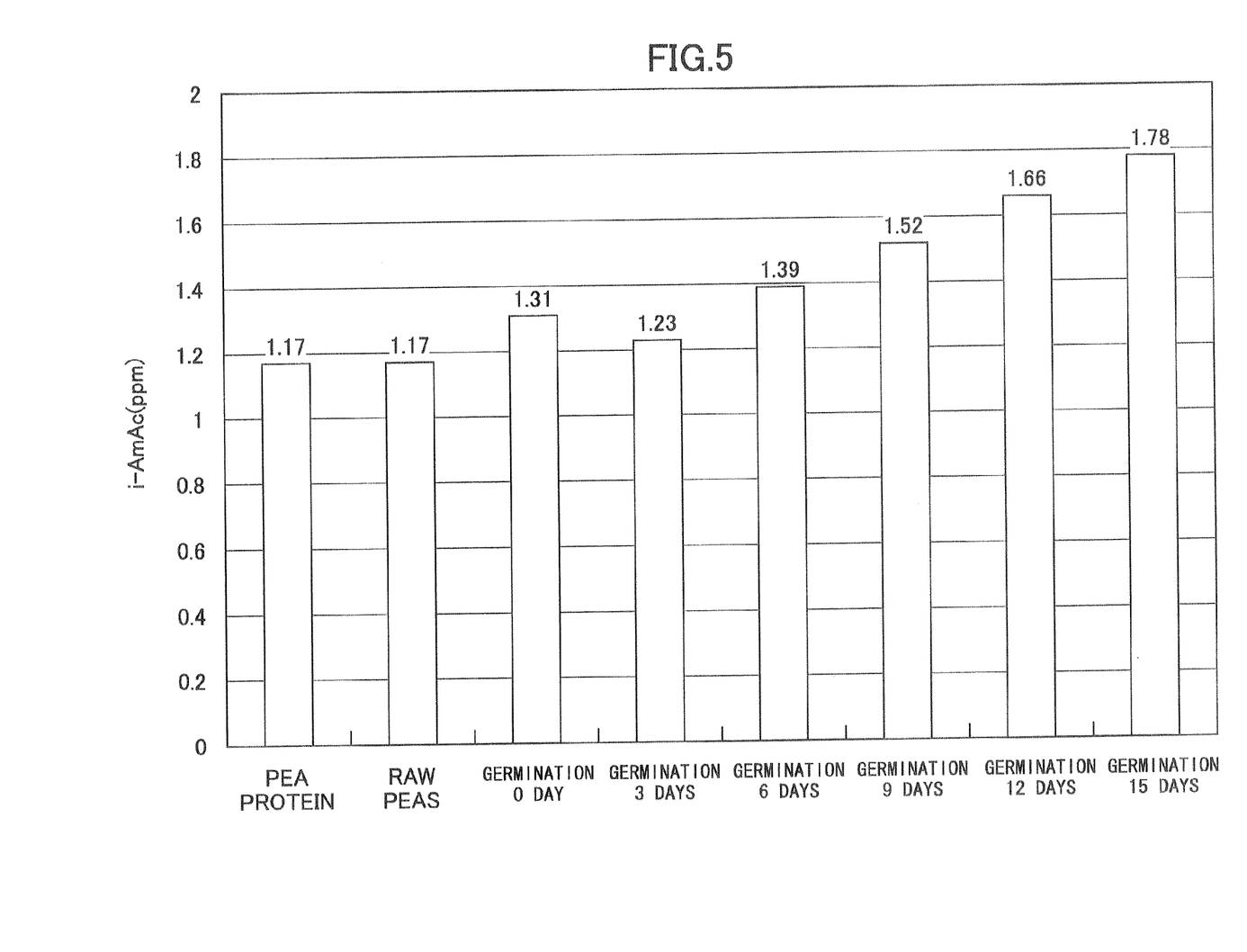
FIG. 5 is a graph showing the amount of isoamyl acetate of the beer-flavored foaming alcoholic beverages which were produced by using peas where the germination days are different as sources of nitrogen.

A sensory evaluation was performed with 6 expert panelists for flavor, in which influence of the germinated peas as opposed to the flavor of the foaming alcoholic beverages was examined, and the result is shown in FIG. 4. Comparing the flavor of the foaming alcoholic beverages, the flavor of the foaming alcoholic beverages using the germinated peas was better than that of using pea protein and raw peas, and it is recognized that such tendency becomes more significant as the germination period becomes longer. FIG. 5 shows the contained amount of isoamyl acetate which is said to have a large influence on the flavor of beer, low-malt beer and foaming alcoholic beverages. Compared to examinations using pea protein and raw peas, the amount of isoamyl acetate contained in foaming alcoholic beverages using germinated peas is high. Isoamyl acetate gives beer, low-malt beer and foaming alcoholic beverages a fruit flavor. It was confirmed that the balance of flavor can be adjusted by controlling the germination period of the peas.

Figure 6:
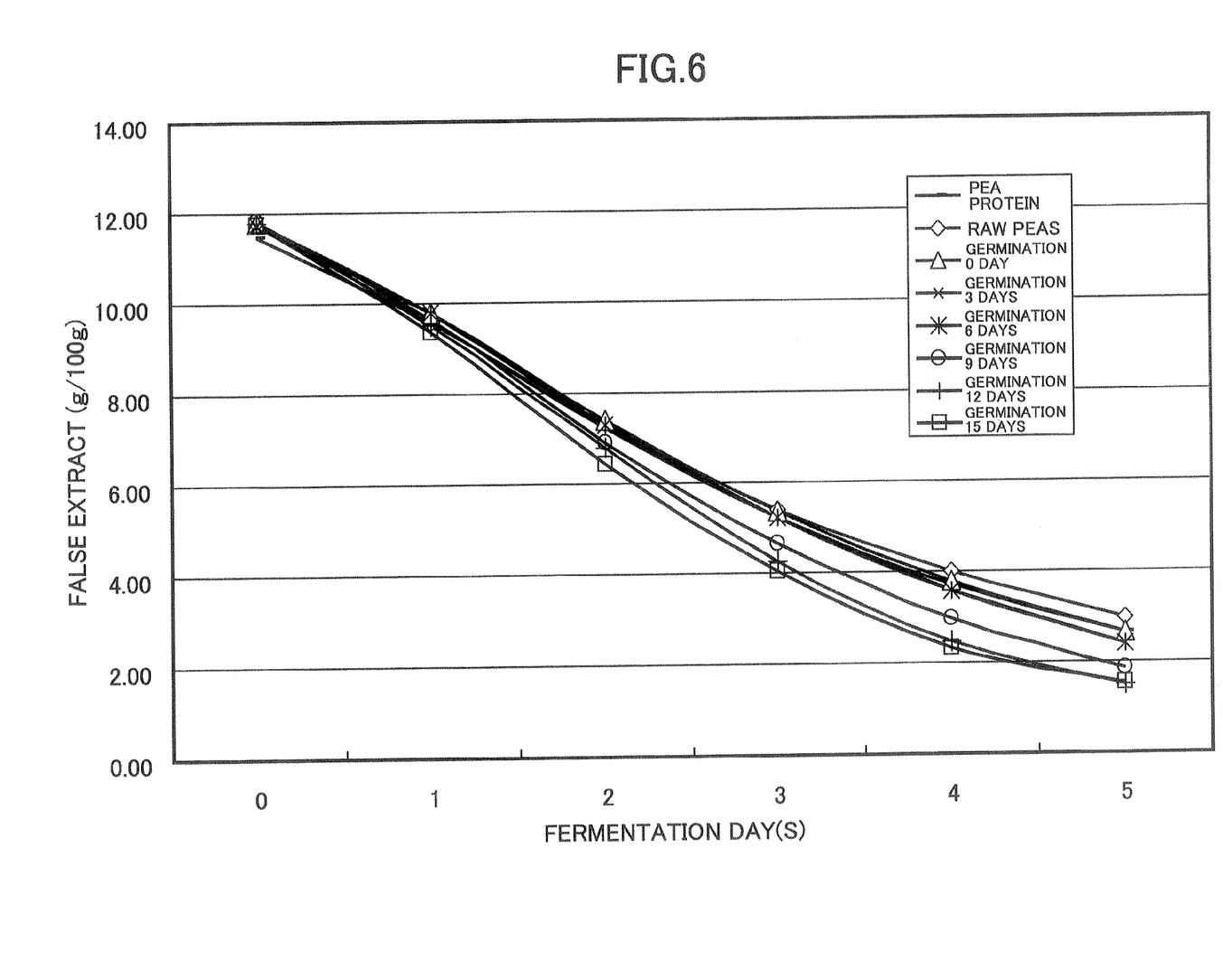
FIG. 6 is a graph showing the fermentability of the beer-flavored foaming alcoholic beverages which were produced by using peas where the germination days are different as sources of nitrogen.

FIG. 6 shows experimenting with what kind of influence the germinated peas give to fermentability of foaming alcoholic beverages. The fermentation period was shortened approximately one day with respect to peas having a long germination period. This is because of increasing amino acids which are nutrients for brewers' yeasts when using germinated peas (see FIG. 3).

Example 2

Next, with the above-described method of producing beer-flavored foaming alcoholic beverages, among grains besides the germinated peas, beans such as black soy beans, Taisho Kintoki beans, adzuki beans and green beans were germinated, dried into fine powder, and used as a part of the raw materials so as to measure the foam stability (NIBEM value) and the amount of free amino nitrogen (FAN value) for each of the beans.

In the present example, the same experimental brewing method as the above example 1 was performed except using black soy beans, Taisho Kintoki beans, adzuki beans, soy beans, green beans and peas which were germinated for six days. That is, as production processes different from example 1, the conditions in the germination of example 2 are that black soy beans, Taisho Kintoki beans, adzuki beans, soy beans, green beans and peas were soaked in water of 0-40° C. for 1-48 hours, respectively, then the germination was performed at 0-40° C. while maintaining a wet condition for a germination period of 6 days. Furthermore, the same as example 1, 15.6 g of black soy beans, Taisho Kintoki beans, adzuki beans, soy beans, green beans and peas were used for the six day germination, respectively. In example 2, experimental brewing using pea protein as a contrast sample was performed where the same pea protein as example 1 was used.

Since the experimental brewing method of example 2 was totally the same as the method of the above example 1 except for using black soy beans, Taisho Kintoki beans, adzuki beans, soy beans, green beans and peas which were germinated for six days, a detailed explanation of the experimental brewing method is omitted.

Figure 7:
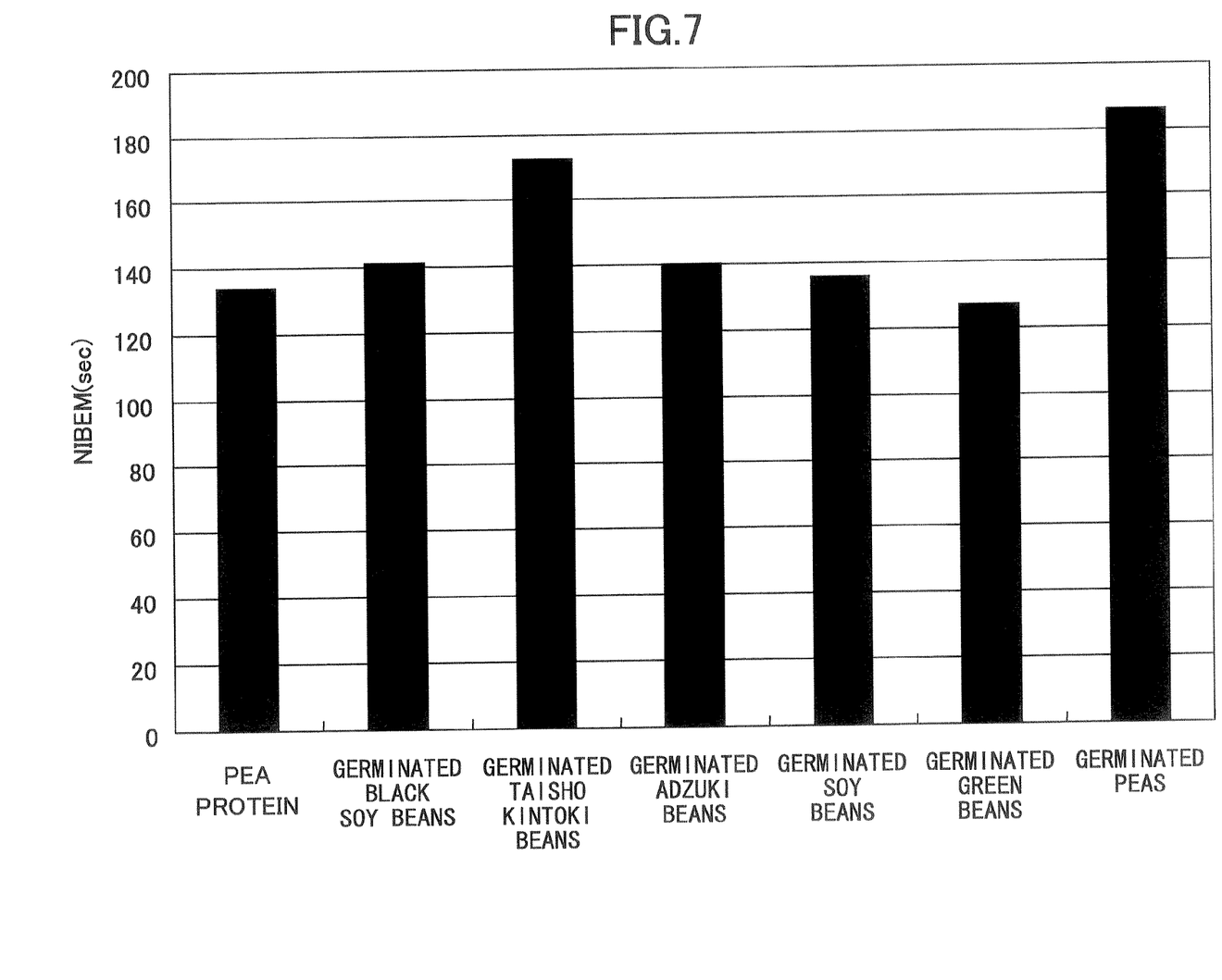
FIG. 7 is a graph showing NIBEM values of the beer-flavored foaming alcoholic beverages which were produced by using black soy beans, Taisho Kintoki beans, adzuki beans, soy beans, green beans and peas where the germination days is 6 days and pea protein was used as sources of nitrogen.

FIG. 7 shows foam stability (NIBEM values) of each examination sample of example 2.

As recognized from FIG. 7, except for germinated green beans, the NIBEM values increased more than those of using pea protein. Especially, foam stability was good when using Taisho Kintoki beans and peas which were germinated for six days.

Figure 8:
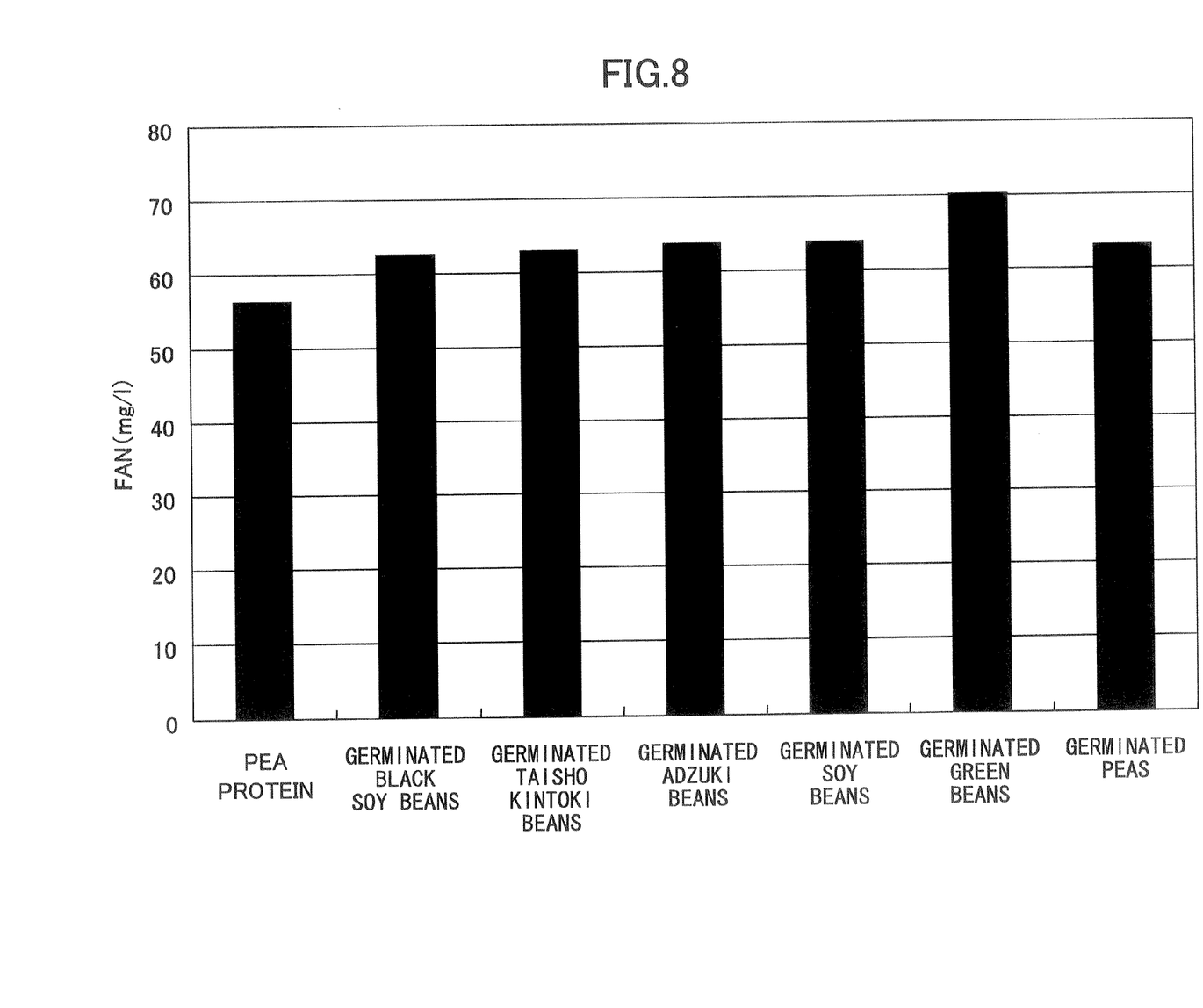
FIG. 8 is a graph showing free amino nitrogen (FAN) values of the beer-flavored foaming alcoholic beverages which were produced by using black soy beans, Taisho Kintoki beans, adzuki beans, soy beans, green beans and peas where the germination days is 6 days and pea protein as sources of nitrogen.

Also, FIG. 8 shows an amount of free amino nitrogen (FAN value) included in the above examination samples of the example 2. As recognized from the FIG. 8, FAN value in each examination sample increases more than that of using pea protein for contrast. In addition, both FAN value and total amount of amino acids are indexes of the content of sources of nitrogen serving as the nutrient for brewers' yeasts.

Therefore, by using the above beans which germinated for a period of six days, it is recognized that low molecular protein and sources of nitrogen which affect flavor and foam stability were included in abundance compared to that using pea protein.

Furthermore, a sensory evaluation was performed with 6 expert panelists for flavor in the same manner as example 1. The results are shown in Table 1.

Therefore, in producing beer-flavored foaming alcoholic beverages according to example 2, it can be recognized that quality such as flavor, foam quality and fermentability for a beer-flavored foaming alcoholic beverage can be improved by appropriately using the above-described beans germinated for six days.

As explained above, based on the above results, with the method of producing a foaming alcoholic beverage according to the present invention, a foaming alcoholic beverage having a foam quality peculiar to foaming alcoholic beverages and a flavor improved to a flavor represented by beer can be provided by selecting at least one material from a group consisting of corns, potatoes, peas, soy beans, black soy beans, adzuki beans, Taisho Kintoki beans and unpolished rice, and using a germinated material obtained by germinating the selected material.

Therefore, beer, low-malt beer and beer-flavored foaming alcoholic beverages having superior flavor and improved foam quality can be provided. Especially, a beer-flavored foaming alcoholic beverage can be provided with a refreshing taste peculiar to beer-flavored foaming alcoholic beverages and a unique flavor of beer along with attaining an improved foam quality.

The present invention is not limited to the specifically disclosed embodiment, and variations and modifications may be made without departing from the scope of the present invention.

The present application is based on Japanese Priority Application No.2005-125325 filed on Apr. 22, 2005, the entire contents of which are hereby incorporated by references.

The invention claimed is:

1. A method of producing a foaming alcoholic beverage, the method comprising:

TABLE 1

| SENSORY EVALUATION | | | | | | | |
|---|---|---|---|---|---|---|---|
| | PEA PROTEIN | GERMINATED BLACK SOY BEANS | GERMINATED TAISHO KINTOKI BEANS | GERMINATED ADZUKI BEANS | GERMINATED SOY BEANS | GERMINATED GREEN BEANS | GERMINATED PEAS |
| SMELL | | | | | | | |
| | SMELL OF SULFIDE | SMELL OF SULFIDE, SMELL OF SULFUR | SCENT OF ESTER, BALANCE IS GOOD | SMELL OF BEANS, SLIGHT SMELL OF SULFUR | SMELL OF SULFIDE, SMELL OF SULFUR | SMELL OF SULFUR | SCENT OF ESTER, BALANCE IS GOOD |
| FLAVOR | | | | | | | |
| | ACIDITY, BITTERNESS | BITTERNESS | SLIGHT BITTERNESS | SLIGHT SWEETNESS, BITTERNESS | UNPLEASANT TASTE, ACIDITY | PLAIN, LIGHT TASTE | SLIGHT BITTERNESS |
| TOTAL EVALUATION | | | | | | | |
| EXCELLENT | 1 | 0 | 3 | 1 | 1 | 1 | 1 |
| GOOD | 1 | 4 | 2 | 5 | 2 | 4 | 3 |
| AVERAGE | 4 | 2 | 1 | 0 | 3 | 1 | 2 |

As shown in TABLE 1, although unique flavors are exhibited depending on the characteristics of the beans, it can be recognized that beans can be utilized as a raw material for a beer-flavored foaming alcoholic beverage. Especially, compared to the sample using pea protein as contrast, it can be recognized that the samples using peas and Taisho Kintoki beans, which were germinated for six days, have more flavor of ester, exhibit more balanced better flavor, and are more suitable for the method of producing foaming alcoholic beverage according to the present invention.

germinating for up to 6 days at least one material selected from the group consisting of peas and Taisho Kintoki beans by soaking the material in water to produce a germinated material; and adding said germinated material to a preformentation mixture, fermenting said preformentation mixture with brewer's yeast to produce a foaming alcoholic beverage;

wherein said foaming alcohol beverage has a superior NIBEM value compared to an otherwise identical beverage made from a prefermentation mixture not containing said germinated material, and wherein the foaming alcoholic beverage is either a low malt beer or a beer-flavor foaming alcoholic beverage.

2. The method of producing a foaming alcoholic beverage of claim 1, further comprising producing a pre-fermentation mixture by mashing raw materials used to make the foaming alcoholic beverage with the germinated material, optionally after the germinated material has been milled.

3. The method of producing a foaming alcoholic beverage of claim 1, further comprising milling the germinated material to produce a milled germinated material and mashing the milled germinated material with the other raw materials to produce a prefermentation mixture.

4. The method of producing a foaming alcoholic beverage of claim 3, wherein said germinated material, or milled germinated material, is used within 15 days of germination.

5. The method of producing a foaming alcoholic beverage of claim 2, wherein the production of the pre-fermentation mixture further comprises boiling of the milled germinated material or the germinated material and the other raw materials.

6. The method of producing a foaming alcoholic beverage of claim 5, wherein the production of the pre-fermentation mixture further comprises adding a coloring agent and a flavoring agent to the pre-fermentation mixture during the boiling process.

7. The method of producing a foaming alcoholic beverage of claim 1, wherein said germinated material is germinated peas.

8. The method of producing a foaming alcoholic beverage of claim 1, wherein said germinated material is germinated Taisho Kintoki beans.

9. The method of producing a foaming alcoholic beverage of claim 2, comprising production of a pre-fermentation liquid with the germinated material together with other raw materials, wherein the other raw materials include a material that contains sources of carbon and a material that contains sources of nitrogen.

10. The method of producing a foaming alcoholic beverage of claim 1, wherein said soaking is at a temperature of 0 to 40° C. for 1 to 48 hours.

11. The method of producing a foaming alcoholic beverage of claim 1, wherein said fermenting is performed for up to 15 days.

* * * * *